No. 776,323. PATENTED NOV. 29, 1904.
J. B. HIGGINBOTHAM.
FELLY JOINT.
APPLICATION FILED JULY 21, 1904.
NO MODEL.
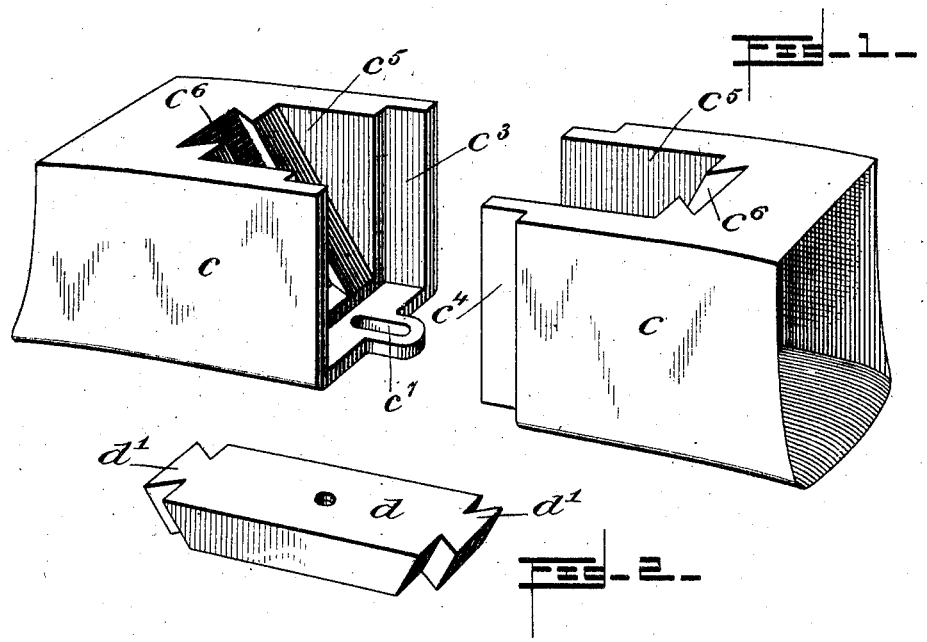
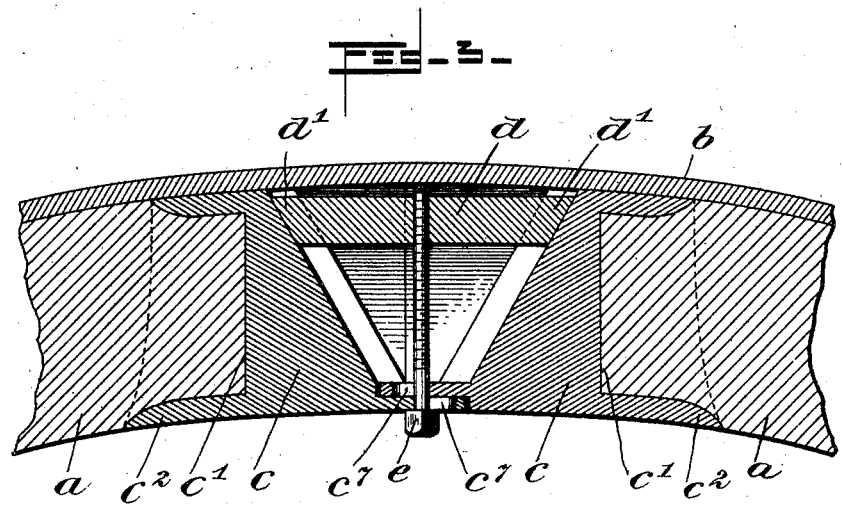
WITNESSES:
INVENTOR
Joseph B. Higginbotham
BY
ATTORNEYS No. 776,323. Patented November 29, 1904.

UNITED STATES PATENT OFFICE.

JOSEPH BERRY HIGGINBOTHAM, OF ABERDEEN, SOUTH DAKOTA, ASSIGNOR OF ONE-TENTH TO JOHN S. HIGGINBOTHAM, OF ABERDEEN, SOUTH DAKOTA.

FELLY-JOINT.

SPECIFICATION forming part of Letters Patent No. 776,323, dated November 29, 1904.

Application filed July 21, 1904. Serial No. 217,493. (No model.)

*To all whom it may concern:*

Be it known that I, JOSEPH BERRY HIGGINBOTHAM, a citizen of the United States, and a resident of Aberdeen, in the county of Brown and State of South Dakota, have invented a new and Improved Felly-Joint, of which the following is a full, clear, and exact description.

The invention relates to an improved device for connecting the sections of a wheel-felly so that the necessary tension may be exerted on said sections to draw them forcibly together and produce a rigid self-sustaining felly, which with the addition of the tire encircling it forms a most secure and durable structure.

Reference is had to the accompanying drawings, forming a part of this specification and illustrating as an example one form of my invention, in which drawings like letters of reference represent like parts in the several views, and in which—

Figure 1 is a perspective view of the two parts of the joint, showing them disconnected. Fig. 2 is a perspective view of the key which connects said parts of the joint, and Fig. 3 is a longitudinal section showing the joint in operative adjustment and illustrating its relation to the sections of the felly and to the tire of the wheel.

$a$ indicates the felly-sections, and $b$ the tire, which latter element is in the form of a continuous band and is sprung or shrunk over the felly-sections in the usual manner.

$c$ indicates the parts of the felly-joints, which parts are formed with sockets $c'$, receiving the ends of the felly-sections, the extremities thereof being reduced to fit snugly within the sockets and the inner walls of said sockets being extended, as indicated at $c^2$, to furnish at the inner side an additional support or engaging surface, thus accounting for the extra strain which is exerted at this point.

The parts $c$ of the joint are adapted to telescope one within the other, for which purpose one part is provided with a cavity $c^3$ and the other with a reduced part $c^4$. The sections or parts of the joint are also formed with cavities $c^5$ in their adjacent ends, said cavities having inclined dovetailed grooves $c^6$ in their opposite walls. Extending across the cavities $c^5$ and having its dovetailed ends $d'$ fitting in the grooves $c^6$ is a key $d$. The ends of this key are beveled corresponding to the inclination of the grooves $c^6$, and by drawing said key inward, with its ends in the grooves, it is clear that the parts $c$ of the joint will be spread from each other, and in this manner the sections of the felly will be moved into secure engagement, a reverse movement drawing the parts together. For operating the key $d$ in the manner explained I employ a bolt $e$, which is rotatably seated in overlapping slotted ears $c^7$, formed on the joint-sections $c$. Said bolt is threaded and engaged with the key, so that by applying a wrench or other tool to the bolt pressure may be exerted on the key in either direction, tightening or relaxing the joint, as may be desired. The slots $c^7$ allow relative movement of the sections without interference from the bolt $e$.

By this construction the felly-sections may be held firmly together, and after the tire is in place the whole structure will furnish a durable and secure arrangement with which the spokes of the wheel may be engaged in the usual manner, thus providing a wheel the peripheral part of which is of the maximum strength and which may be adjusted from time to time to compensate for expansion and contraction of the parts.

Various changes in the form, proportions, and minor details of my invention may be resorted to at will without departing from the spirit and scope thereof. Hence I consider myself entitled to all such variations as may lie within the terms of my claims.

Having thus described my invention, I claim as new and desire to secure by Letters Patent—

1. A felly-joint comprising two relatively movable joint-sections respectively adapted to engage the felly-sections, and each having an undercut groove the grooves opposing each other and inclining toward each other, a key having essentially dovetailed ends sliding in the grooves and connecting the joint-sections, and means for laterally moving the key to move the joint-sections toward or from each other.

2. A felly-joint comprising two relatively movable joint-sections respectively adapted to engage the felly-sections, and each having an undercut groove the grooves opposing each other and inclined toward each other, a key having essentially dovetailed ends sliding in the grooves and connecting the joint-sections, and means for laterally moving the key to move the joint-sections toward or from each other, said means comprising a screw having threaded connection with the key and rotatable connection with the joint-sections.

3. A felly-joint comprising two relatively movable joint-sections respectively adapted to engage the felly-sections, and each having an undercut groove the grooves opposing each other and inclining toward each other, a key having essentially dovetailed ends sliding in the grooves and connecting the joint-sections, and means for laterally moving the key to move the joint-sections toward or from each other, said means comprising a screw having threaded connection with the key and the joint-sections having overlapping slotted ears in which the screw is rotatably mounted.

In testimony whereof I have signed my name to this specification in the presence of two subscribing witnesses.

JOSEPH BERRY HIGGINBOTHAM.

Witnesses:
    J. S. MOBRY,
    E. G. BRADLEY.